(12) United States Patent
Cohen

(10) Patent No.: US 9,690,827 B2
(45) Date of Patent: Jun. 27, 2017

(54) PERFORMING GRAPH OPERATIONS USING HISTORIC INVERSE PROBABILITY ESTIMATORS

(71) Applicant: Microsoft Technology Licensing, LLC, Redmond, WA (US)

(72) Inventor: Edith Cohen, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 251 days.

(21) Appl. No.: 14/252,936

(22) Filed: Apr. 15, 2014

(65) Prior Publication Data

US 2015/0293922 A1    Oct. 15, 2015

(51) Int. Cl.
*G06F 17/30* (2006.01)

(52) U.S. Cl.
CPC .... *G06F 17/3053* (2013.01); *G06F 17/30109* (2013.01); *G06F 17/30516* (2013.01); *G06F 17/30958* (2013.01); *G06F 17/30598* (2013.01); *G06F 17/30616* (2013.01)

(58) Field of Classification Search
CPC .......... G06F 17/3053; G06F 17/30109; G06F 17/30516; G06F 17/30958; G06F 17/30616; G06F 17/30598; G06F 11/206
USPC ....... 707/749, 737, 755, 713, 769, 748, 798, 707/780, 999.004; 382/225, 228; 345/440
See application file for complete search history.

(56) References Cited

U.S. PATENT DOCUMENTS

| | | | |
|---|---|---|---|
| 8,140,539 B1 | 3/2012 | Cohen et al. | |
| 8,166,047 B1* | 4/2012 | Cohen | G06F 17/30424 706/48 |
| 2008/0243816 A1* | 10/2008 | Chan | G06F 17/30867 |
| 2009/0303901 A1* | 12/2009 | Duffield | H04L 43/024 370/253 |
| 2010/0070509 A1 | 3/2010 | Li et al. | |
| 2010/0153387 A1 | 6/2010 | Cohen et al. | |
| 2011/0029571 A1 | 2/2011 | Aggarwal et al. | |
| 2012/0054177 A1 | 3/2012 | Wang et al. | |
| 2012/0197834 A1* | 8/2012 | Panigrahy | G06N 5/048 706/52 |
| 2012/0299925 A1* | 11/2012 | Najork | G06T 11/206 345/440 |
| 2013/0103711 A1* | 4/2013 | Woodruff | G06F 17/30486 707/769 |

OTHER PUBLICATIONS

Potamias et al, "k-Nearest Neighbors in Uncertain Graphs", 36th International Conference on Very Large Data Bases (VLDB) Singapore, vol. 3. No. 1, Sep. 13-17, 2010, pp. 997-1008.*

(Continued)

*Primary Examiner* — Tony Mahoudi
*Assistant Examiner* — Kamal Dewan
(74) *Attorney, Agent, or Firm* — Jonathan M. Waldman

(57) ABSTRACT

Historic inverse probability estimators are created for a graph based on all-distance sketches associated with each node of the graph. The historic inverse probability estimators include adjusted weights for each node. Graph operations such as closeness centrality are estimated using the historic inverse probability estimators. The historic inverse probability estimators can also be applied to element streams and can be used to estimate a number of unique elements in received in the element stream.

24 Claims, 7 Drawing Sheets

(56) References Cited

OTHER PUBLICATIONS

Cohen Edith, 'All-Distances Sketches, Revisited: HIP Estimators for Massive Graph Analysis', Published in IEEE Transactions on Knowledge and Data Engineering (vol. 27, Issue 9), Sep. 2015, pp. 2320-2334.*
Lu, et al., "String Similarity Measures and Joins with Synonyms", Proceedings of the ACM SIGMOD International Conference on Management of Data, Jun. 22, 2013, pp. 373-384.
Ioffe, Sergey, "Improved Consistent Sampling, Weighted Minhash and L1 Sketching", Proceedings of the 10th IEEE International Conference on Data Mining, Sydney, Dec. 14, 2010, 10 pages.
Li, et al., "Using Sketches to Estimate Two-way and Multi-way Associations", Technical Report MSR-TR-2005-115, Sep. 2005, 67 pages.
Aingworthy, et al., "Fast Estimation of Diameter and Shortest Paths (Without Matrix Multiplication)", Journal of SIAM Journal on Computing, vol. 28, Issue 4, Aug. 1999, 20 pages.
Akiba, et al., "Fast Exact Shortest-Path Distance Queries on Large Networks by Pruned Landmark Labeling", Proceedings of the ACM SIGMOD International Conference on Management of Data, Jun. 22, 2013, 12 pages.
Alon, et al., "The Space Complexity of Approximating the Frequency Moments", Journal of Computer and System Sciences, vol. 58, Issue 1, Feb. 1999, pp. 137-147.
Backstrom, et al., "Four Degrees of Separation", Proceedings of the 3rd Annual ACM Web Science Conference, Jun. 22, 2012, pp. 1-13.
Bar-Yossef, et al., "Counting Distinct Elements in a Data Stream", Proceedings of the 6th International Workshop on Randomization and Approximation Techniques, Sep. 13, 2002, 10 pages.
Boldi, et al., "HyperANF: Approximating the Neighbourhood Function of Very Large Graphs on a Budget", Proceedings of the 20th International Conference on World Wide Web, Jan. 27, 2011, pp. 1-19.
Boldi, et al., "Robustness of Social Networks: Comparative Results Based on Distance Distributions", Proceedings of the Third International Conference on Social Informatics, Oct. 6, 2011, pp. 1-14.
Z. Broder, Andrei, "On the Resemblance and Containment of Documents", Proceedings of the Compression and Complexity of Sequences, Jun. 11, 1997, pp. 1-9.
Z. Broder, Andrei, "Identifying and Filtering Near-Duplicate Documents", Proceedings of the 11th Annual Symposium on Combinatorial Pattern Matching, Jun. 21, 2000, pp. 1-10.
Cohen, Edith, "Size-Estimation Framework with Applications to Transitive Closure and Reachability", Journal of Computer and System Sciences, vol. 55, Issue 3, Dec. 1997, pp. 441-453.
Cohen, et al., "Scalable Similarity Estimation in Social Networks: Closeness, Node Labels, and Random Edge Lengths", Proceedings of the First ACM Conference on Online Social Networks, Oct. 7, 2013, 12 pages.
Cohen, et al., "Spatially-Decaying Aggregation Over a Network: Model and Algorithms", Journal of Computer and System Sciences, vol. 73, Issue 3, May 2007, pp. 265-288.
Cohen, et al., "Summarizing Data Using Bottom-K Sketches", Proceedings of the Twenty-Sixth Annual ACM Symposium on Principles of Distributed Computing, Aug. 12, 2007, pp. 225-234.
Cohen, et al., "Tighter Estimation Using Bottom-K Sketches", Journal of the VLDB Endowment, vol. 1, Issue 1, Aug. 24, 2008, 17 pages.
Cohen, et al., "Maintaining Time-Decaying Stream Aggregates", Proceedings of the Twenty-Second ACM SIGACT-SIGMOD-SIGART Symposium on Principles of Database Systems, Jun. 9, 2003, pp. 1-11.
Dangalchev, Chavdar, "Residual Closeness in Networks", Proceedings of Physica A, vol. 365, Issue 2, Jan. 18, 2006, pp. 556-564.
Duffield, et al., "Priority Sampling for Estimation of Arbitrary Subset Sums", Journal of the ACM, vol. 54, No. 6, Dec. 2007, 37 pages.
Durand, et al., "Loglog Counting of Large Cardinalities (Extended Abstract)", Proceedings of 11th Annual European Symposium on Algorithms, 2003, pp. 605-617.
Eppstein, et al., "Fast Approximation of Centrality", Proceedings of the Twelfth Annual ACM-SIAM Symposium on Discrete Algorithms, Jan. 9, 2001, pp. 1-2.
Feller, William, "An Introduction to Probability Theory and its Applications", John Wiley & Sons, vol. 2, Jul. 1967, 525 pages.
Flajolet, et al., "Hyperloglog: The Analysis of a Near-Optimal Cardinality Estimation Algorithm", Proceedings of 13th Conference on Analysis of Algorithms, Jun. 17, 2007, pp. 127-146.
Flajolet, et al., "Probabilistic Counting Algorithms for Data Base Applications", Journal of Computer and System Sciences, vol. 31, Issue 2, Oct. 1985, pp. 182-209.
Heule, et al., "HyperLogLog in Practice: Algorithmic Engineering of a State of the Art Cardinality Estimation Algorithm", Proceedings of the 16th International Conference on Extending Database Technology, Mar. 18, 2013, 10 pages.
Horvitz, et al., "A Generalization of Sampling without Replacement from a Finite Universe", Journal of the American Statistical Association, vol. 47, No. 260, Dec. 1952, pp. 662-685.
Kane, et al., "An Optimal Algorithm for the Distinct Elements Problem", Proceedings of the Twenty-Ninth ACM SIGMOD-SIGACT-SIGART Symposium on Principles of Database Systems, Jun. 6, 2010, 12 pages.
Malewicz, et al., "Pregel: a System for Large-Scale Graph Processing", Proceedings of the ACM SIGMOD International Conference on Management of Data, Jun. 6, 2010, pp. 135-145.
Ohlsson, Esbjorn, "Sequential Poisson Sampling", Journal of Official Statistics, vol. 14, No. 2, Retrieved on: Feb. 3, 2014, pp. 149-162.
Palmer, et al., "ANF: a Fast and Scalable Tool for Data Mining in Massive Graphs", Proceedings of the Eighth ACM SIGKDD International Conference on Knowledge Discovery and Data Mining, Jul. 2002, pp. 81-90.
Roditty, et al., "Fast Approximation Algorithms for the Diameter and Radius of Sparse Graphs", Proceedings of the 45th Annual ACM Symposium on Symposium on Theory of Computing, Jun. 1, 2013, 10 pages.
Rosenblatt, Murray, "Remarks on Some Nonparametric Estimates of a Density Function", Proceedings of the Annals of Mathematical Statistics, vol. 27, No. 3, Sep. 1956, pp. 832-837.
"NIST/SEMATECH e-Handbook of Statistical Methods", Published on: Apr. 2012 Available at: http://www.itl.nist.gov/div898/handbook/.

* cited by examiner

PERFORMING GRAPH OPERATIONS USING HISTORIC INVERSE PROBABILITY ESTIMATORS

BACKGROUND

Graphs are often used to model relationships between entities such as links between websites on the Internet, and users of social networking applications. As may be appreciated, such networks are often very large and include a large number of nodes and edges. Due to the size of these graphs, computations using the graphs may require a large amount of computational resources.

One such computation is known as the distance distribution. The distance distribution of a node i contains for each distance d, the number of nodes in a graph that are a distance d from i. The distance distribution of the graph is the number of node pairs for each distance d. The distance distribution captures useful properties of the nodes of the graph including node centrality and effective diameter.

One method for determining the distance distribution is by computing an all-distances sketch for each node. An all-distances sketch for a node v includes a random sample of nodes from the graph, where the inclusion probability of a node u in the sample decreases with its distance from v. The generated all-distances sketch for each node in the graph can be used to estimate the distance distribution of the graph as well as other graph operations such as node closeness, and more general queries.

SUMMARY

Historic inverse probability (HIP) estimators are created for a graph based on all-distance sketches associated with each node of the graph. The historic inverse probability estimators include adjusted weights for each node. Graph operations such as closeness centrality are estimated using the historic inverse probability estimators. The historic inverse probability estimators can also be applied to element streams and can be used to estimate a number of unique elements in the element stream.

In an implementation, a graph is received by a computing device. The graph includes nodes. For each node of the graph, an all-distances sketch is received by the computing device. The all-distances sketch associated with a node includes a subset of the nodes and a distance between the associated node and each node of the subset of the nodes. For each node of the graph, a historic inverse probability estimator is determined or computed for the node using the all-distances sketch associated with the node by the computing device. A request to perform one or more graph operations on the graph is received. The one or more graph operations may include a request to estimate a property of the graph. The one or more graph operations are performed on the graph using one or more of the historic inverse probability estimators associated with the nodes by the computing device.

In an implementation, an element associated with a time is received by a computing device. Based on the received element and the associated time, a sketch is updated by the computing device. The sketch is based on previously received elements. An adjusted weight is determined for the element based on the updated sketch by the computing device. A value of a register is updated using the determined adjusted weight by the computing device. A request for a number of distinct elements received so far is received by the computing device. The value of the register is provided by the computing device in response to the request.

This summary is provided to introduce a selection of concepts in a simplified form that are further described below in the detailed description. This summary is not intended to identify key or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
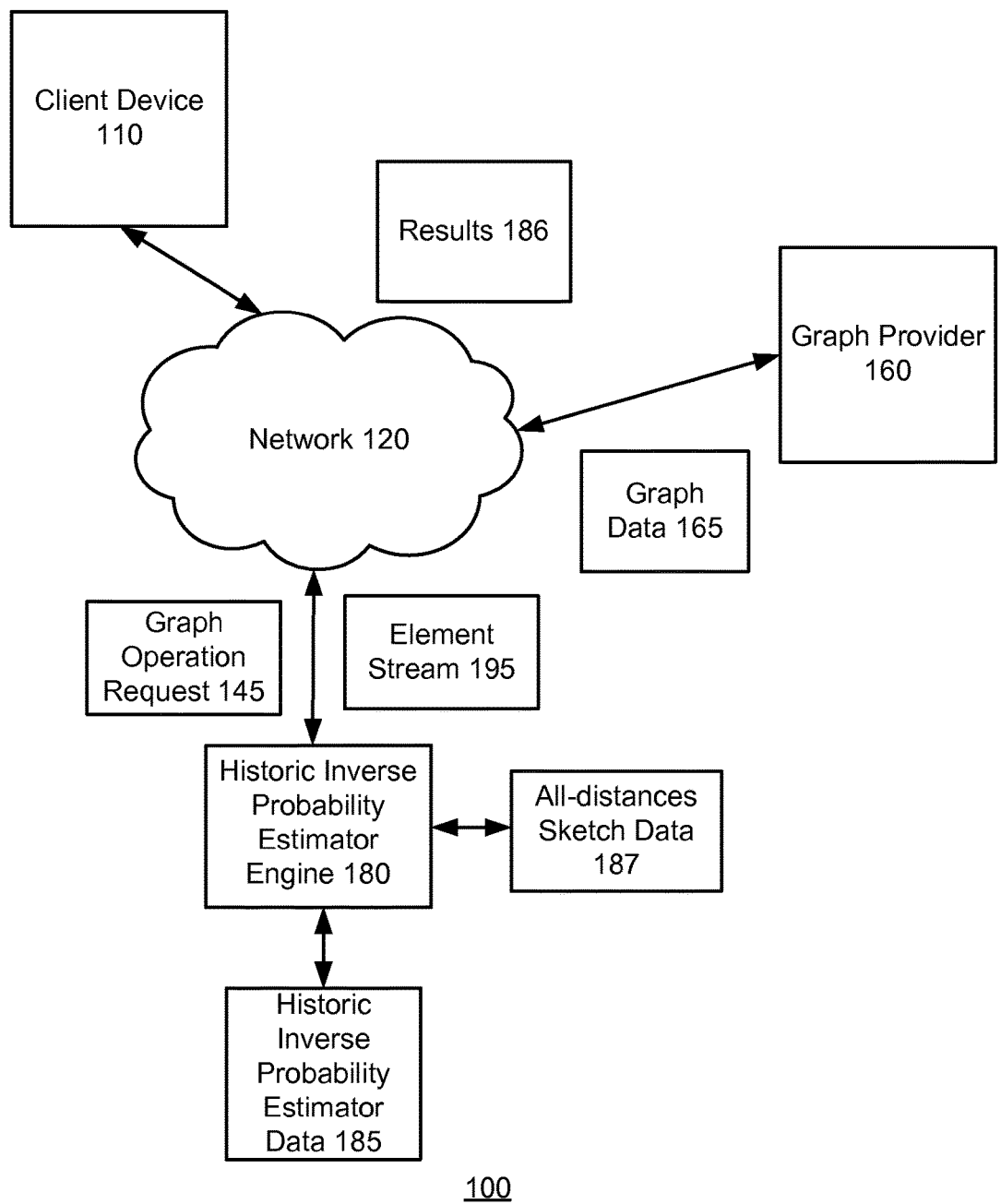
FIG. 1 shows an environment for generating historic inverse probability estimators, and for performing one or more graph operations using the historic inverse probability estimators.

FIG. 1 shows an environment 100 for generating historic inverse probability (HIP) estimators, and for performing one or more graph operations using the HIP estimators. The environment 100 includes a HIP estimator engine 180 that generates one or more HIP estimators from graph data 165 associated with a graph provider 160. The HIP estimators may be stored as the HIP estimator data 185. The graph data 165 may include a graph that is constructed from one or more nodes and edges. The graph may be a weighted or unweighted graph, and may be directed or undirected. The graph may represent a variety of entities and structures such as a social network or the Internet, for example.

The HIP estimator engine 180 and the graph provider 160 may communicate through a network 120. In addition, both the HIP estimator engine 180 and the graph provider 160 may also communicate with one or more client devices 110 through the network 120. Each of the client devices 110 may include a desktop personal computer, workstation, laptop, personal digital assistant (PDA), smartphone, cell phone, or any WAP-enabled device or any other computing device capable of interfacing directly or indirectly with the network 120. The network 120 may be a variety of network types including the public switched telephone network (PSTN), a cellular telephone network, and a packet switched network (e.g., the Internet).

Although one graph provider 160, one HIP estimator engine 180, and one client device 110 are shown, it is for illustrative purposes only; there is no limit to the number of graph providers 160, HIP estimator engines 180, and client devices 110 that may be supported in the environment 100. The graph provider 160, the HIP estimator engine 180, and the client device 110 may be implemented together or separately using one or more computing devices such as the computing device 700 illustrated with respect to FIG. 7.

The HIP estimator engine 180 may use the HIP estimators of the HIP estimator data 185 to perform one or more graph operations with respect to a graph of the graph data 165. The graph operations may include a variety of graph operations such as estimating the distance between nodes of the graph, estimating neighborhood sizes in the graph, and estimating closeness centralities. The graph operations may be received from the client device 110 or the graph provider 160 as a graph operation request 145, results of the graph operation request 145 may be provided to the requesting client device or graph provider as results 186. It has been determined that by using HIP estimators to generate the results 186, the HIP estimator engine 180 may perform the requested graph operations with at most half the variance of previous estimators.

The HIP estimator engine 180 may generate the HIP estimators for a graph using all-distances sketches associated with the graph. There may be an all-distances sketch associated with each node the graph. An all-distances sketch for a node v includes a random sample of nodes from the graph, where the inclusion probability of a node u in the sample decreases with its distance from v. The all-distances sketches are coordinated, meaning that the inclusion of a node in a particular all-distances sketch is positively correlated with the node being included in other nodes. An all-distances sketch is an extension of the min-hash sketch, and the all-distances sketch of a node v may be the union of coordinated min-hash sketches of all the sets of the i closest nodes to v.

Depending on the implementation, the HIP estimator engine 180 may generate all-distances sketches for each node of a graph. Alternatively, the all-distances sketches may be generated by the graph provider 160 and may be received by the HIP estimator engine 180 as part of the graph data 165. The all-distances sketches, whether received or generated by the HIP estimator engine 180, may be stored as the all-distances sketch data 187.

The HIP estimator engine 180 may generate a HIP estimator for a node of a graph using the all-distances sketch associated with the node of the graph. In some implementations, the HIP estimator engine 180 may generate a HIP estimator from an all-distances sketch for a node i by scanning the entries in the all-distances sketch in order of increasing distance from i, and for each node j scanned, computing an adjusted weight $a_{ij} > 0$. The adjusted weights computed for each node may be stored as the HIP estimator for the node.

In some implementations, the HIP estimator engine 180 may further receive an element stream 195, and may use HIP estimators to estimate the number of unique elements that have been received in the element stream 195. The elements in the element stream 195 may include a variety of elements including number, words, queries received by a search engine, or IP packets, for example. The estimated number of unique elements may be provided to the client device 110 or graph provider 160 as part of the results 186, for example. It has been determined that using HIP estimators to estimate the number of unique elements may use 30% to 50% less memory than previous methods for unique element estimation.

Figure 2:
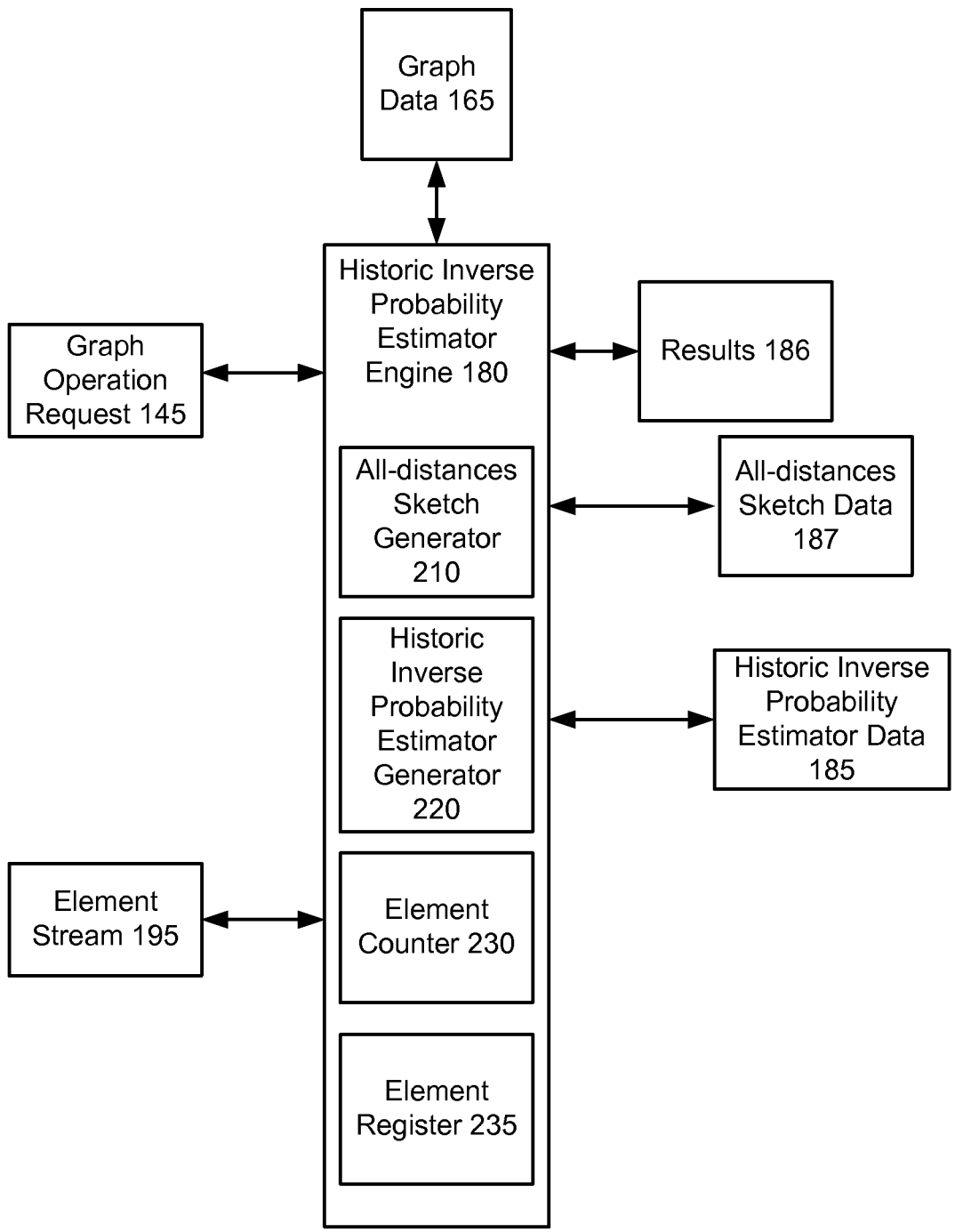
FIG. 2 is an illustration of an historic inverse probability estimator engine.

FIG. 2 is an illustration of a HIP estimator engine 180. As shown, the HIP estimator engine 180 may include several components such as an all-distances sketch generator 210, a HIP estimator generator 220, an element counter 230, and an element register 235. More or fewer components may be supported by the HIP estimator engine 180.

The all-distances sketch generator 210 may generate one or more all-distances sketches based on the graph data 165. The graph data 165 may include a graph, and the all-distances sketch generator 210 may generate an all-distances sketch for each node of the graph and may associate the generated all-distances sketches with the graph as the all-distances sketch data 187. The all-distances sketch generator 210 may generate each all-distances sketch using a variety of methods including a breadth first search or dynamic programming based algorithm. Other methods may be used. Alternatively or additionally, the all-distances sketches may be generated by another source and may be received and stored by the all-distances sketch generator 210 as the all-distances sketch data 187.

An all-distances sketch of a node i may be the union of coordinated min-hash sketches of the neighborhoods $N_d(i)$ for all possible distances in the graph. How the all-distances sketch is generated by the all-distances sketch generator 210 may depend on the type of min-hash that is used. In some implementations, the all-distances sketch generator 210 may generate an all-distances sketch using one of three types of min-hash sketch where k determines the size of the sketch: k-mins sketch; k-partition sketch; and bottom-k sketch.

Depending on the type of sketch, each sketch may be randomized and defined with respect to one or more random permutations on the domain U, where U is the total number of nodes of the graph. Each permutation of the sketch may be specified by assigning random rank values $r(j) \sim U[0,1]$ to each node. The permutations may comprise a list of nodes sorted by increasing rank order.

For the k-mins sketches, the all-distances sketch generator 210 may generate each sketch of the all-distances sketch by including in the sketch the node having the smallest rank in each of k independent permutations. For the k-partition sketch, the all-distances sketch generator 210 may generate each sketch by first mapping the nodes to k buckets, and including in the sketch the node with the smallest rank in each of the k buckets. These methods correspond to sampling k times with replacement.

For the bottom-k sketches, the all-distances sketch generator 210 may generate each sketch using the k smallest ranked nodes in a single permutation. This method corresponds to sampling k times without replacement.

The HIP estimator generator 220 may generate a HIP estimator for each node of a graph using the all-distances sketch associated with the node from the all-distances sketch data 187. The generated HIP estimators may be stored by the HIP estimator generator 220 as the HIP estimator data 185. The HIP estimator generator 220 may generate a HIP estimator from the all-distances sketch associated with a node i by scanning the entries in the all-distances sketch in order of increasing distance from i, and for each node $j \in ADS(i)$, generating an adjusted weight $a_{ij} > 0$ for the node. The collection of adjusted weights for a node may be the HIP estimator for the node and may be stored as the HIP estimator data 185.

For all-distances sketches generated using bottom-k sketches, the HIP estimator generator 220 may generate an adjusted weight for a node v by first listing nodes by increasing Dijkstra rank with respect to v. For each node i an inclusion threshold value $\tau_i$ may be computed or determined using Equation 1, where k is the number of samples in the sketches and $\phi_{<i}(v)$ is the set of nodes that are closer to the node v than the node i:

$$\tau_i = k_r^{th}\{\phi_{<i}(v) \cap ADS(v)\} \quad (1).$$

The HIP estimator generator 220 may set the adjusted weight $a_{vi}$ for a node i to 0 if $i \notin ADS(v)$ and may set the adjusted weight $a_{vi}$ to $1/\tau_i$ if $i \in ADS(v)$. The generated adjusted weights for each node are inverse-probability estimates with respect to the probability $\tau_i$ of including the node i in ADS(v).

For all-distances sketches generated using k-mins sketches and k-partition sketches, the HIP estimator generator 220 may similarly set the adjusted weight $a_{vi}$ for a node i to 0 if $i \notin ADS(v)$ and may set the adjusted weight $a_{vi}$ to $1/\tau_i$ if $i \in ADS(v)$. However, how the inclusion threshold value $\tau_i$ is determined may be changed. For k-mins sketches, a node i is included in an ADS(v) only if it has a rank value that is smaller than the minimum rank in $\phi_{<i}(v)$ in at least one of the k assignments $r_h$, $h \in [k]$. Conditioned on fixed ranks of the nodes in $\phi_{<i}(v)$, the HIP estimator generator 220 may determine the inclusion threshold using Equation 2:

$$\tau_i = 1 - \Pi_{h=1}^{k}(1 - \min(r_h(j)_{j \leq i-1})) \quad (2).$$

For k-partition sketches, the rank values and the partition mapping (to one of k buckets $V_1, \ldots, V_k$) may be fixed for all nodes in $\phi_{<i}(v)$. The HIP estimator generator 220 may determine the inclusion threshold using Equation 3:

$$\tau_i = \frac{1}{k}\sum_{h=1}^{k}\min(r(j))_{j \in V_h \cap \varphi_{<i}(v)}. \quad (3)$$

The HIP estimator engine 180 may perform one or more graph operations corresponding to the graph operation request 145 using the HIP estimators stored in the HIP estimator data 185. In some implementations, the graph operations may include arbitrary operations $Q_g(i)$ where $g(j, d_{ij}) \geq 0$ is an arbitrary function of node identifiers and distances, and may be represented by Equation 4:

$$Q_g(i) = \Sigma_{j|d_{ij}<\infty} g(d_{i,j},j) \quad (4).$$

Using the adjusted weights of the HIP estimators, the HIP estimator engine 180 may estimate $Q_g(i)$ as $\hat{Q}_g(i)$ using Equation 5 as a sum over the nodes in the all-distances sketch associated with the node i:

$$\hat{Q}_g(i) = \Sigma_{j \in ADS(i)} a_{ij} g(d_{i,j},j) \quad (5).$$

Another requested graph operation may be for the distance decay closeness centrality of a node i. A general form of the distance decay closeness centrality $C_{\alpha,\beta}(i)$ is shown in Equation 6, where $\alpha \geq 0$ is a monotone non-increasing function and $\beta \geq 0$ is a non-negative function over node identifiers:

$$C_{\alpha,\beta}(i) = \Sigma_{j|d_{i,j}<\infty} \alpha(d_{i,j})\beta(j) \quad (6).$$

Using the adjusted weights of the HIP estimators, the HIP estimator engine 180 may estimate $C_{\alpha,\beta}(i)$ as $\hat{C}_{\alpha,\beta}(i)$ using Equation 7:

$$\hat{C}_{\alpha,\beta}(i) = \Sigma_{j \in ADS(i)} \alpha_{ij} \alpha(d_{i,j}) \beta(j) \quad (7).$$

By adjusting the functions and/or values used for $\alpha$ or $\beta$, the HIP estimator engine 180 may estimate a variety of graph operations using Equation 7. For example, the function $\beta$ may be adjusted to filter or weigh nodes according to metadata. Neighborhood cardinality may be calculated by setting $\beta \equiv 1$ and $\alpha(x)=1$ if $x \leq d$ and $\alpha(x)=0$ otherwise. Setting $\alpha(x) \equiv 1$ may calculate the number of reachable nodes from i, setting $\alpha(x) = 2^{-x}$ may calculate exponential attenuation with distance, and setting $\alpha(x)=1/x$ may calculate the inverse harmonic mean of distances from i. Other operations may be supported.

The element counter 230 may receive a stream of elements in an element stream 195 and may calculate an approximate count of a number of unique elements that have been received in the element stream 195. The element counter 230 may receive a request for the approximate count from the client device 110, and may provide the approximate count as part of the results 186, for example. While shown as being part of the historic inverse probability estimator engine 180, the element counter 230 may be implemented separately from the historic inverse probability estimator engine 180. Moreover, the element counter 230 may be applied to data structures and/or contexts other than graphs.

In some implementations, the element counter 230 may determine the approximate number of unique elements by maintaining a min-hash sketch of the elements that have been received so far in the element stream 195. In addition, the element counter 230 may maintain an element register 235 that may be used to keep a running estimate of the number of unique elements that have been received in the element stream 195.

When an element of the element stream 195 is received, a determination is made as to whether the min-hash sketch may be updated based on the received element. For example, the element counter 230 may determine whether the particular element would be sampled for the min-hash sketch based on the type of sketch that is being used (i.e., k-min, bottom-k, and k-partition).

If the min-hash sketch is updated based on the received element, then the element counter 230 may determine the adjusted weight for the new element in the min-hash sketch. The adjusted weight may be calculated similarly as described above for a node of an all-distances sketch. The calculated adjusted weight may then be added to the count stored in the element register 235.

Figure 3:
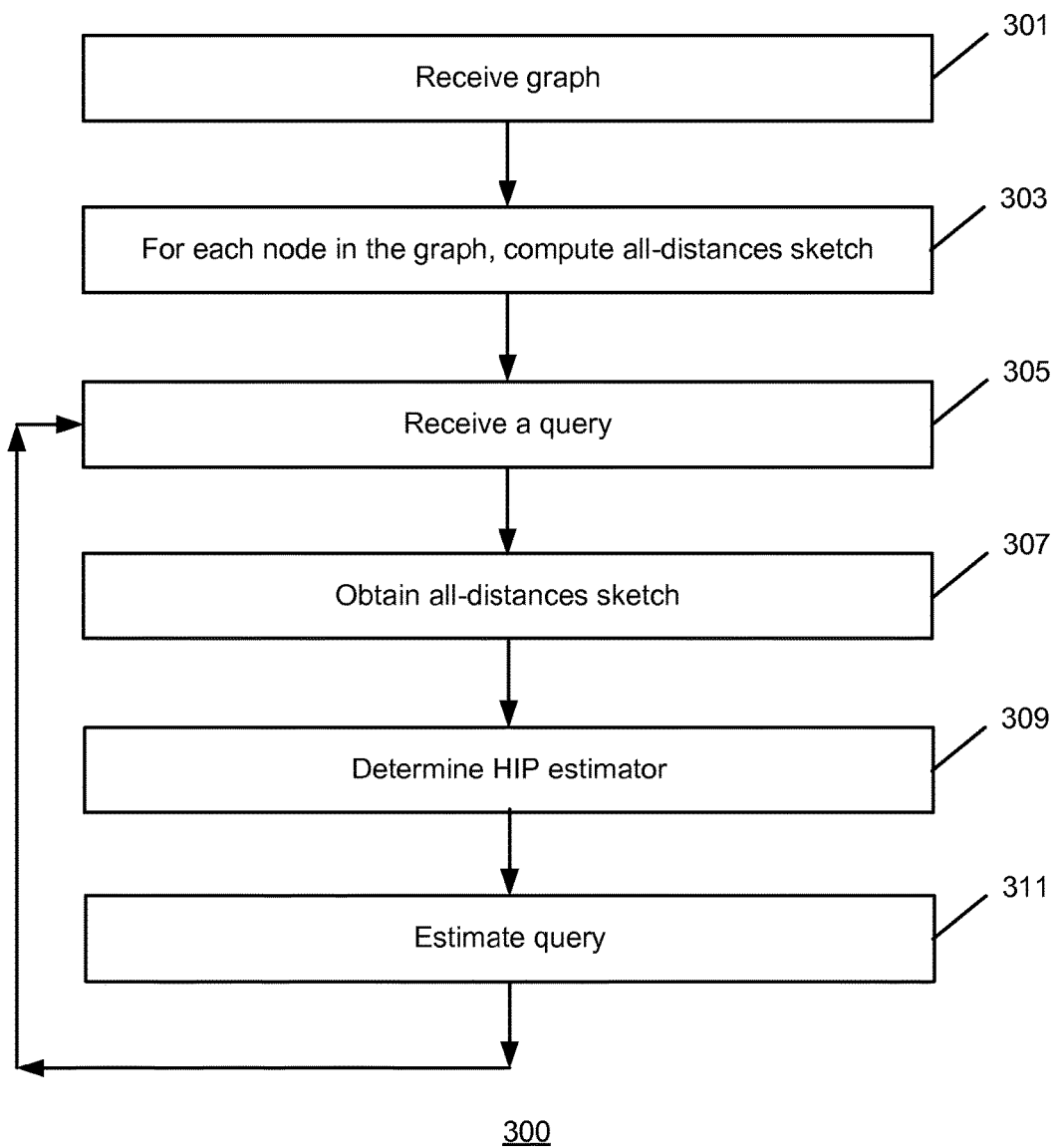
FIG. 3 is an operational flow of an implementation of a method for computing historic inverse probability estimators and for performing one or more graph operations using the computed historic inverse probability estimators.

FIG. 3 is an operational flow of an implementation of a method 300 for computing HIP estimators and for performing one or more graph operations using the computed HIP estimators. The method 300 may be implemented by the HIP estimator engine 180, for example.

A graph is received at 301. The graph may be received by the HIP estimator engine 180 from the graph provider 160 as part of the graph data 165. The graph may include a plurality of nodes and a plurality of edges. The graph may be weighted or unweighted graph and may be directed or undirected.

For each node in the graph, an all-distances sketch is computed at 303. Each all-distances sketch may be computed by the all-distances sketch generator 210 and stored as the all-distances sketch data 187. An all-distances sketch for a node may be a union of min-hash sketches associated with the node. Depending on the implementation, the min-hash sketches may be one or more of k-mins sketches, bottom-k sketches, and k-partition sketches, for example. Each all-distances sketch may be generated by the all-distances sketch generator 210 using a variety of methods including breadth first search and dynamic programming, depending on the implementation. Other methods may be used.

A query is received at 305. The query may be a request to perform a graph operation such as estimating closeness centrality for a node v. The query may be received by the HIP estimator engine 180.

The all-distances sketch is obtained at 307. The all-distances sketch may correspond to the node v may be obtained by the HIP estimator engine 180 from the all-distances sketch data 187.

An HIP estimator is determined at 309. The HIP estimator may be determined for the node v using the obtained all-distances sketch by the HIP estimator generator 220 of the HIP estimator engine 180. In some implementations, the HIP estimator generator 220 may generate the HIP estimator for node v by calculating an adjusted weight for every entry in the obtained all-distances sketch. A method for calculating an adjusted weight is described with respect to FIG. 5 by the method 500. Other methods may be used.

Depending on the implementation, the HIP estimators may be determined for each node prior to step 305. The determined HIP estimators may be stored as the HIP estimator data 185. Each HIP estimator may be determined in linear time according to the size of the all-distances sketch.

The query is estimated at 311. The graph operation associated with the query may be estimated by the HIP estimator engine 180 and may be provided in response to the query. After providing the estimate, the method 300 may return to 305 where a new query may be received.

The one or more graph operations are performed on the graph using the HIP estimators at 309. The one or more graph operations may be performed by the HIP estimator engine 180 using the HIP estimators of the HIP estimator data 185. Performing the one or more graph operations may include estimating the one or more graph operations by the HIP estimator engine 180. Where the graph operation is the closeness centrality of a node, the operation may be estimated using the previously described Equation 7, for example. After estimating the one or more graph operations, the HIP estimator engine 180 may provide the estimates as the results 186.

Figure 4:
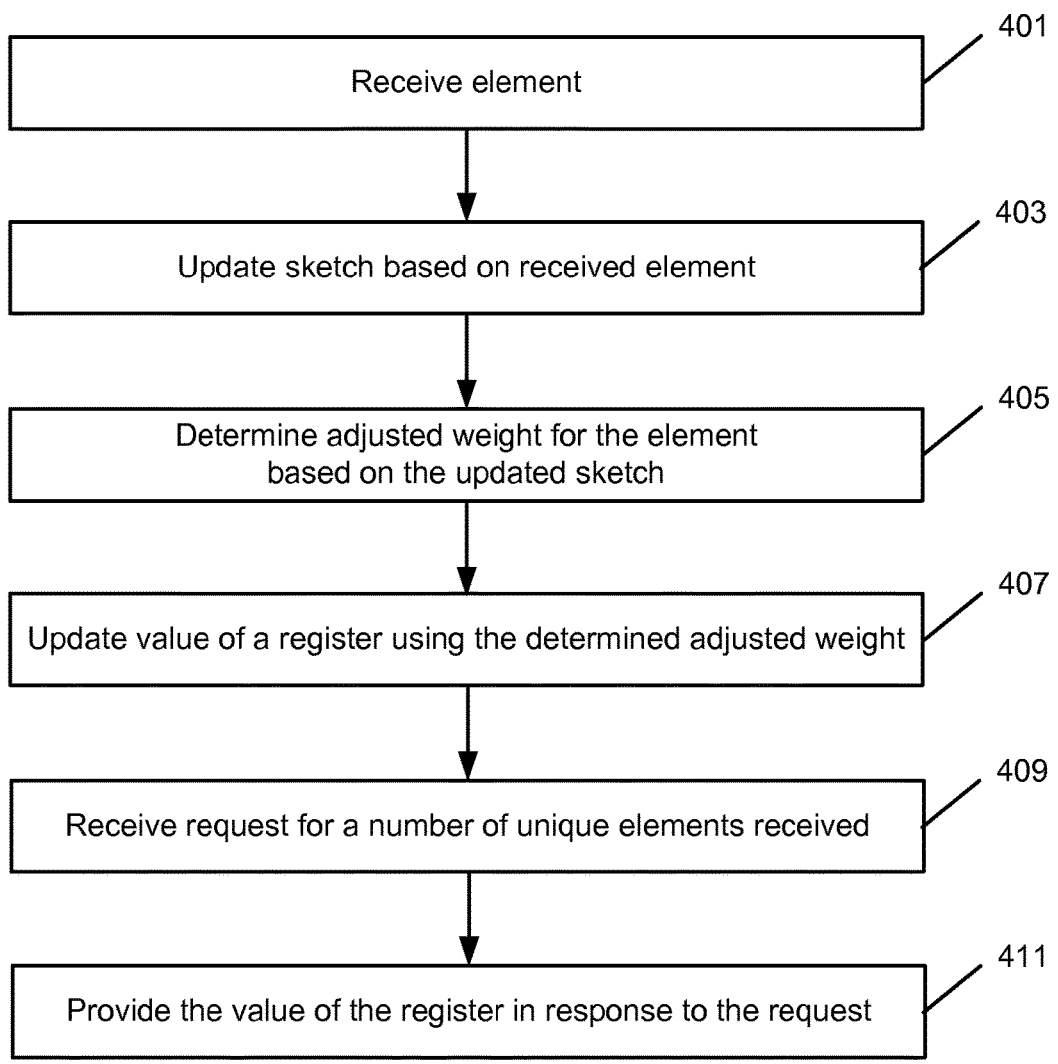
FIG. 4 is an operational flow of an implementation of a method for estimating a number of unique elements that have been received in a stream of elements.

FIG. 4 is an operational flow of an implementation of a method 400 for estimating a number of unique elements that have been received in a stream of elements. The method 400 may be implemented by the element counter 230 of the HIP estimator engine 180, for example.

An element is received at 401. The element may be received by the element counter 230 of the HIP estimator engine 180. The received element may be associated with a time. The elements may be part of the element stream 195 and may include a variety of elements including numbers, words, characters, packets, etc. The set of elements received so far may be represented by a graph with node for each element and edges that represent the times at which the elements were received.

A sketch is updated based on the received element at 403. The sketch may be updated by the element counter 230. In some implementations, the sketch may be a min-hash sketch.

An adjusted weight for the element is determined based on the updated sketch at 405. The adjusted weight may be determined by the element counter 230. The adjusted weight may be determined using the method 500 described with respect to FIG. 5. Other methods may be used.

A value of a register is updated using the determined adjusted weight at 407. The register may be the element register 235 and may be updated by the element counter 230 based on the adjusted weight. In some implementations, the value of the element register 235 may be updated by adding the adjusted weight to the value stored in the element register 235.

A request for a number of unique elements is received at 409. The request may be received by the element counter 230 from the client device 110, for example.

The value of the register is provided in response to the request at 411. The value of the element register 235 may be provided to the client device 110 in response to the received request. The value of the element register 235 may be an estimate of the number of unique elements received so far in the element stream 195.

Figure 5:
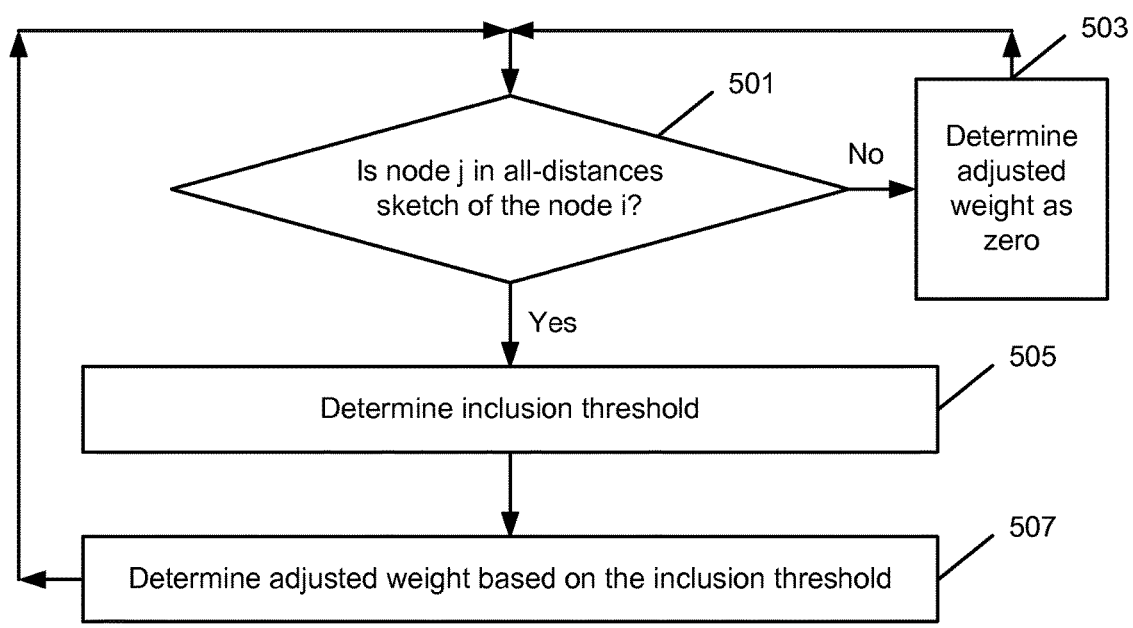
FIG. 5 is an operational flow of an implementation of a method for determining an adjusted weight for a node.

FIG. 5 is an operational flow of an implementation of a method 500 for determining an adjusted weight for a node. The method 500 may be implemented by the HIP estimator generator 220 of the HIP estimator engine 180, for example.

A determination is made as to whether a node j is in an all-distances sketch of a node i at 501. The determination may be made by the HIP estimator generator 220 of the HIP estimator engine 180. If the node j is in the all-distances sketch of the node i then the method 500 may continue at 505. Otherwise, the method 500 may continue at 503.

The adjusted weight is determined to be zero at 503. The adjusted weight $a_{ij}$ may be determined to be zero and may be added to the HIP estimator associated with the node i by the HIP estimator generator 220. After adding the adjusted weight $a_{ij}$ the method 500 may return to 501 where a next node j of the graph may be considered for the node i.

An inclusion threshold is determined at 505. The inclusion threshold $\tau$ may be determined by the HIP estimator generator 220. How the inclusion threshold is determined may depend on the type of sketches used to generate the all-distances sketch. For example, where the all-distances sketch is generated from bottom-k sketches, the inclusion threshold may be determined using Equation 1. Where the all-distances sketch is generated from k-min sketches, the inclusion threshold may be determined using Equation 2. Where the all-distances sketch is generated from partition-k sketches, the inclusion threshold may be determined using Equation 3.

The adjusted weight is determined based on the inclusion threshold at 507. The adjusted weight may be determined based on the inclusion threshold by the HIP estimator generator 220. The adjusted weight $a_{ij}$ may be the inverse of the inclusion threshold. The adjusted weight $a_{ij}$ may be added to the HIP estimator associated with the node i by the HIP estimator generator 220. After adding the adjusted weight $a_{ij}$ the method 500 may return to 501 where a next node j of the graph may be considered for the node i.

Figure 6:
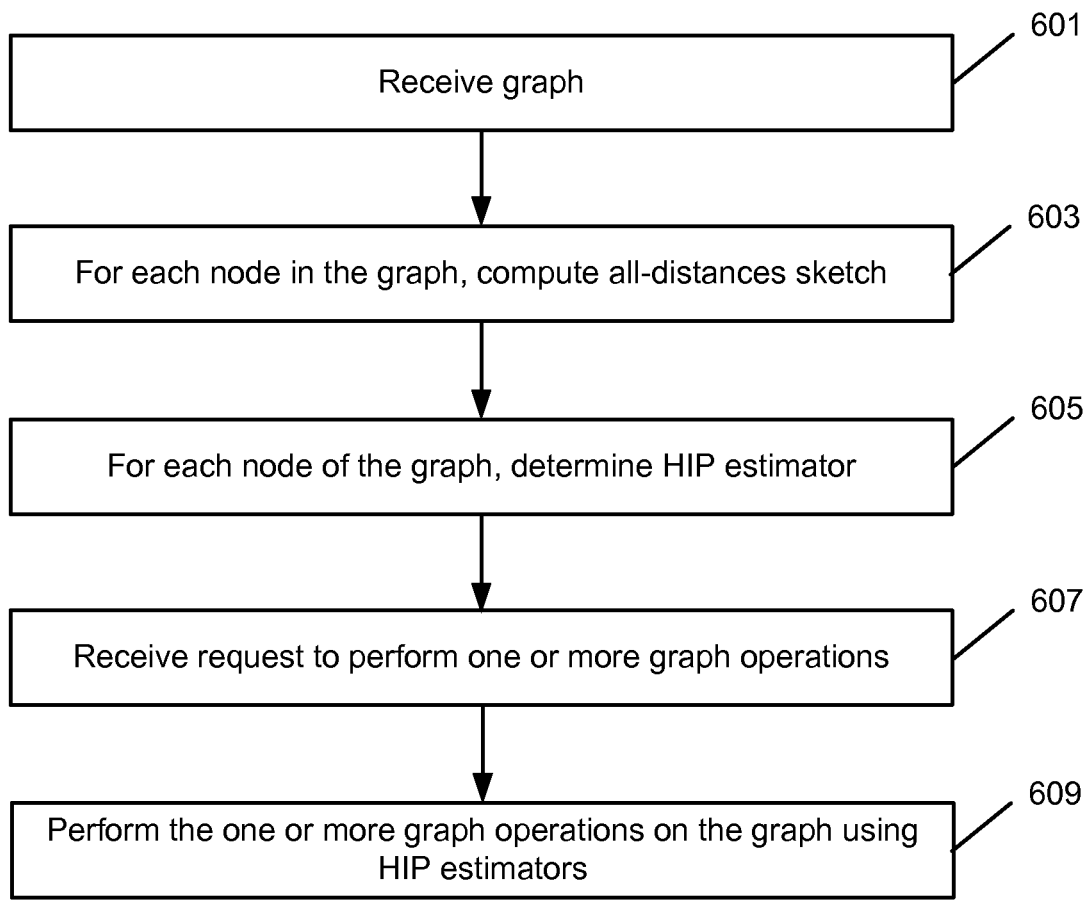
FIG. 6 is an operational flow of an implementation of a method for computing historic inverse probability estimators and for performing one or more graph operations using the computed historic inverse probability estimators.

FIG. 6 is an operational flow of an implementation of a method 600 for computing HIP estimators and for performing one or more graph operations using the computed HIP estimators. The method 600 may be implemented by the HIP estimator engine 180, for example.

A graph is received at 601. The graph may be received by the HIP estimator engine 180 from the graph provider 160 as part of the graph data 165. The graph may include a plurality of nodes and a plurality of edges. Depending on the implementation, the graph may be a weighted or an unweighted graph and may be directed or undirected.

For each node in the graph, an all-distances sketch is received at 603. Each all-distances sketch may be received by the HIP estimator engine 180 as the all-distances sketch data 187. An all-distances sketch for a node may include a plurality of nodes randomly sampled from the graph for the node. The probability of a sampled node being sampled from the graph for a particular node decreases as the distance between the sampled node and the particular node increases. An all-distances sketch for a node may be a union of min-hash sketches associated with the node. Depending on the implementation, the min-hash sketches may be one or more of k-mins sketches, bottom-k sketches, and k-partition sketches, for example.

Alternatively, rather than receiving each all-distances sketch, some or all of the all-distances sketches may be generated by the all-distances sketch generator 210 of the HIP estimator engine 180. Each all-distances sketch may be generated by the all-distances sketch generator 210 using a variety of methods including breadth first search and dynamic programming, depending on the implementation. Other methods may be used.

For each node in the graph, a HIP estimator is determined at 605. Each HIP estimator may be determined by the HIP estimator generator 220 of the HIP estimator engine 180. The HIP estimator generator 220 may generate a HIP estimator for a node based on the all-distances sketch associated with the node from the all-distances sketch data 187. In some implementations, the HIP estimator generator 220 may generate a HIP estimator for a node by calculating an adjusted weight between the node and every other node in the all-distances sketch associated with the node. A method for calculating an adjusted weight is described with respect to FIG. 5 by the method 500. Other methods may be used.

A request to perform one or more graph operations is received at 607. The request may be received by the HIP estimator engine 180. The request may be to perform a graph operation such as the closeness centrality and may be received by the client device 110 or the graph provider 160. Other graph operations may be supported.

The one or more graph operations are performed on the graph using the HIP estimators at 609. The one or more graph operations may be performed by the HIP estimator engine 180 using the HIP estimators of the HIP estimator data 185. Performing the one or more graph operations may include estimating the one or more graph operations by the HIP estimator engine 180. Where the graph operation is the closeness centrality of a node, the operation may be estimated using the previously described Equation 7, for example. After estimating the one or more graph operations, the HIP estimator engine 180 may provide the estimates as the results 186.

Figure 7:
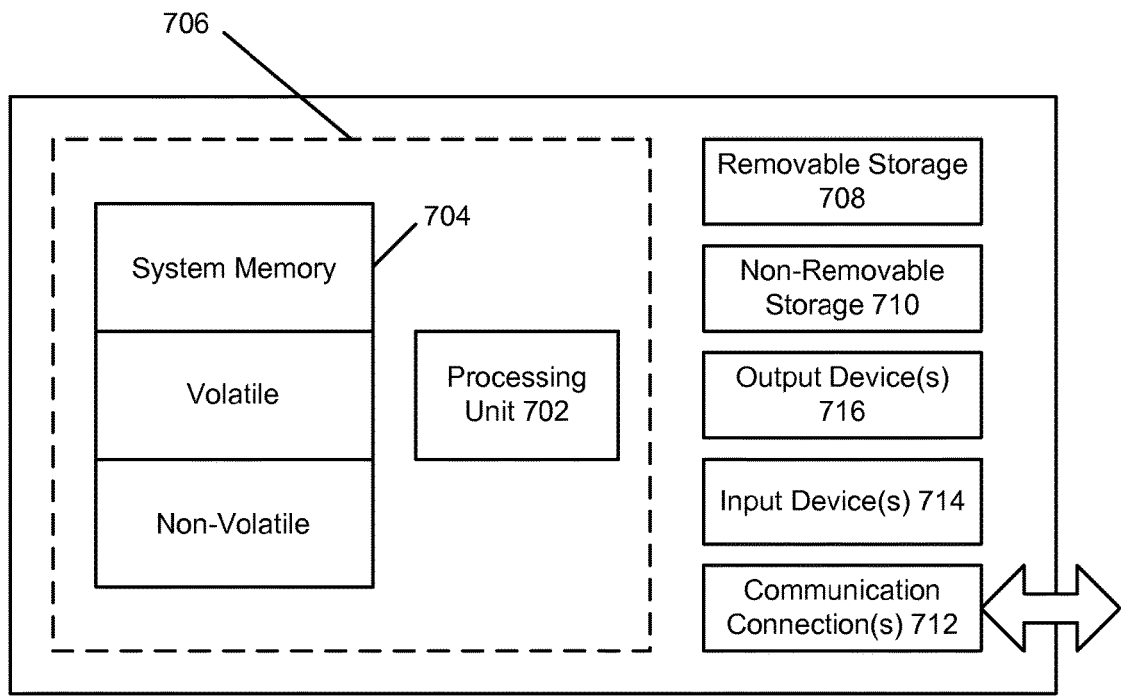
FIG. 7 shows an exemplary computing environment.

FIG. 7 shows an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, an exemplary system for implementing aspects described herein includes a computing device, such as computing device 700. In its most basic configuration, computing device 700 typically includes at least one processing unit 702 and memory 704. Depending on the exact configuration and type of computing device, memory 704 may be volatile (such as random access memory (RAM)), non-volatile (such as read-only memory (ROM), flash memory, etc.), or some combination of the two. This most basic configuration is illustrated in FIG. 7 by dashed line 706.

Computing device 700 may have additional features/functionality. For example, computing device 700 may include additional storage (removable and/or non-removable) including, but not limited to, magnetic or optical disks or tape. Such additional storage is illustrated in FIG. 7 by removable storage 708 and non-removable storage 710.

Computing device 700 typically includes a variety of computer readable media. Computer readable media can be any available media that can be accessed by device 700 and include both volatile and non-volatile media, and removable and non-removable media.

Computer storage media include volatile and non-volatile, and removable and non-removable media implemented in any method or technology for storage of information such as computer readable instructions, data structures, program modules or other data. Memory 704, removable storage 708, and non-removable storage 710 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of computing device 700.

Computing device 700 may contain communication connection(s) 712 that allow the device to communicate with other devices. Computing device 700 may also have input device(s) 714 such as a keyboard, mouse, pen, voice input device, touch input device, etc. Output device(s) 716 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
    receiving a graph by a computing device, wherein the graph comprises a plurality of nodes;
    for each node of the graph, receiving an all-distances sketch by the computing device, wherein an all-distances sketch associated with a node comprises a subset of the plurality of nodes and a distance between the associated node and each node of the subset of the plurality of nodes;
    for each node of the graph, determining a historic inverse probability (HIP) estimator for the node using the all-distances sketch associated with the node by scanning the entries from the all-distances sketch in order of increasing distance from the node, and for each entry scanned, determining an adjusted weight, by the computing device, wherein the HIP estimator includes the adjusted weights for every entry scanned for the node;
    receiving a request to perform one or more graph operations on the graph; and
    performing the one or more graph operations on the graph using one or more of the HIP estimators associated with the nodes by the computing device.

2. The method of claim 1, wherein the one or more graph operations comprises closeness centrality.

3. The method of claim 1, wherein determining the HIP estimator for a node using the all-distances sketch associated with the node comprises:
    for each node of the subset of nodes of the all-distances sketch, determining an adjusted weight between the node of the subset of nodes and the node associated with the all-distances sketch.

4. The method of claim 3, wherein determining the adjusted weight between the node of the subset of nodes and the node associated with the all-distances sketch comprises:
    determining an inclusion threshold for the node of the subset of nodes; and
    determining the adjusted weight based on the determined inclusion threshold of the node.

5. The method of claim 4, wherein determining the adjusted weight based on the determined inclusion threshold of the node comprises determining the adjusted weight based on an inverse of the determined inclusion threshold.

6. The method of claim 1, wherein each all-distances sketch is a union of coordinated min-hash sketches.

7. The method of claim 6, wherein the min-hash sketches are one or more of k-min sketches, bottom-k sketches, and k-partition sketches.

8. The method of claim 1, further comprising generating the all-distances sketch associated with each node.

9. A system comprising:
    at least one computing device;
    an all-distances sketch generator adapted to:
        for each node of a graph comprising a plurality of nodes, generate an all-distances sketch for the node, wherein an all-distances sketch associated with a node comprises a subset of the plurality of nodes and a distance between the associated node and each node of the subset of the plurality of nodes; and
    a historic inverse probability (HIP) estimator generator adapted to:
        for each node, compute a HIP estimator for the node using the all-distances sketch associated with the node by scanning the entries from the all-distances sketch in order of increasing distance from the node, and for each entry scanned, determine an adjusted weight, wherein the HIP estimator includes the adjusted weights for every entry scanned for the node; and
        perform one or more graph operations on the graph using one or more of the HIP estimators associated with the nodes.

10. The system of claim 9, wherein the system further comprises an element counter adapted to:
    receive an element associated with a time;
    based on the received element and the associated time, update a sketch, wherein the sketch is based on a plurality of previously received elements;
    determine an adjusted weight of the element based on the updated sketch; and
    update a value of a register using the determined adjusted weight.

11. The system of claim 10, wherein the element counter is further adapted to:
    receive a request for a number of distinct elements received; and
    provide the value of the register in response to the request.

12. The system of claim 10, wherein the element is received in a stream of elements.

13. The system of claim 10, wherein the sketch comprises a min-hash sketch.

14. The system of claim 9, wherein the one or more graph operations comprises one or more of a distance estimate between two nodes of the graph, and a closeness centrality of the graph.

15. The system of claim 9, wherein the HIP estimator generator is adapted to:
    for each node of the subset of nodes of the all-distances sketch, compute an adjusted weight between the node of the subset of nodes and the node associated with the all-distances sketch.

16. The method of claim 15, wherein the HIP estimator generator is adapted to:
    determine an inclusion threshold for the node of the subset of nodes; and
    determine the adjusted weight based on the determined inclusion threshold of the node.

17. A system comprising:
    at least one computing device adapted to:
        receive a graph, wherein the graph comprises a plurality of nodes;
        for each node of the graph, receive an all-distances sketch, wherein an all-distances sketch associated with a node comprises a subset of the plurality of nodes and a distance between the associated node and each node of the subset of the plurality of nodes; and
    a historic inverse probability (HIP) estimator generator adapted to:

for each node of the graph, determine a historic inverse probability (HIP) estimator for the node using the all-distances sketch associated with the node by scanning the entries from the all-distances sketch in order of increasing distance from the node, and for each entry scanned, determine an adjusted weight, by the computing device, wherein the HIP estimator includes the adjusted weights for every entry scanned for the node;

receive a request to perform one or more graph operations on the graph; and perform the one or more graph operations on the graph using one or more of the HIP estimators associated with the nodes.

18. The system of claim 17, wherein the one or more graph operations comprises closeness centrality.

19. The system of claim 17, wherein determining the HIP estimator for a node using the all-distances sketch associated with the node comprises:

for each node of the subset of nodes of the all-distances sketch, determining an adjusted weight between the node of the subset of nodes and the node associated with the all-distances sketch.

20. The system of claim 19, wherein determining the adjusted weight between the node of the subset of nodes and the node associated with the all-distances sketch comprises:

determining an inclusion threshold for the node of the subset of nodes; and determining the adjusted weight based on the determined inclusion threshold of the node.

21. The system of claim 20, wherein determining the adjusted weight based on the determined inclusion threshold of the node comprises determining the adjusted weight based on an inverse of the determined inclusion threshold.

22. The system of claim 17, wherein each all-distances sketch is a union of coordinated min-hash sketches.

23. The system of claim 22, wherein the min-hash sketches are one or more of k-min sketches, bottom-k sketches, and k-partition sketches.

24. The system of claim 17, further comprising an all-distances sketch generator adapted to generate the all-distances sketch associated with each node.

* * * * *